(12) United States Patent
Oren et al.

(10) Patent No.: US 7,740,967 B2
(45) Date of Patent: Jun. 22, 2010

(54) HIGHLY CONDUCTIVE ORDERED ION EXCHANGE MEMBRANES

(75) Inventors: Yoram Oren, Beer Sheva (IL); Viatcheslav Freger, Beer Sheva (IL); Ora Kedem, Haifa (IL); Charles Linder, Rehovot (IL); Eliyahu Korin, Beer Sheva (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 1361 days.

(21) Appl. No.: 10/519,321

(22) PCT Filed: Jul. 3, 2003

(86) PCT No.: PCT/IL03/00557

§ 371 (c)(1),
(2), (4) Date: May 9, 2005

(87) PCT Pub. No.: WO2004/005380

PCT Pub. Date: Jan. 15, 2004

(65) Prior Publication Data

US 2005/0238937 A1    Oct. 27, 2005

(30) Foreign Application Priority Data

Jul. 4, 2002    (IL)    .................................... 150612

(51) Int. Cl.
 *H01M 8/10*    (2006.01)
(52) U.S. Cl. .................. 429/33; 427/243; 427/245; 264/87; 521/27
(58) Field of Classification Search ............ 429/33; 427/243, 245; 521/27; 264/87
See application file for complete search history.

(56) References Cited

U.S. PATENT DOCUMENTS

| 4,433,082 | A | * | 2/1984 | Grot ........................... 524/544 |
| 4,940,525 | A | * | 7/1990 | Ezzell et al. ................. 204/252 |
| 5,082,472 | A | * | 1/1992 | Mallouk et al. ................ 95/49 |
| 5,718,947 | A | * | 2/1998 | Martin et al. ................. 427/243 |
| 5,746,954 | A | * | 5/1998 | Aikman, Jr. ................... 264/87 |
| 5,863,610 | A | * | 1/1999 | Young et al. ................. 427/335 |
| 6,114,031 | A | * | 9/2000 | Roberts et al. .............. 428/333 |
| 2006/0263660 | A1 | * | 11/2006 | Takaoka et al. ................ 429/33 |

* cited by examiner

FOREIGN PATENT DOCUMENTS

WO    WO-2004/005380 A1 *    1/2004

OTHER PUBLICATIONS

Morkved et al., Science, vol. 273, pp. 931-932 (1990).*

*Primary Examiner*—Peter D. Mulcahy
*Assistant Examiner*—Henry Hu
(74) *Attorney, Agent, or Firm*—Roach Brown McCarthy & Gruber, P.C.; Kevin D. McCarthy (57) ABSTRACT

Process for producing ion exchange membranes. A matrix material that comprises a polymeric component chosen from the group consisting of monomeric and oligomeric polymer precursors and cross-linkable polymers is provided. Ion cation or anion exchange particles, or proton or hydroxyl or ion conducting particles, or cation or anion exchange polymers, or proton or hydroxyl or ion conducting polymers are introduced in the matrix. The particles are mixed or the polymer is dissolved with the matrix. The resulting mixture is formed into membrane configuration. The particles or the domains of the polymer formed by polymer-matrix phase separation upon solvent evaporation or cooling, are ordered by an electric field. If the matrix comprises or consists of a polymer precursor or a cross-linkable polymer, the precursor is cured concurrently with the ordering of the particles, or if the matrix comprises a polymer solution or polymer melt the polymer solution is evaporated or the polymer melt is maintained and then cooled concurrently with the ordering of the particles.

29 Claims, 7 Drawing Sheets

HIGHLY CONDUCTIVE ORDERED ION EXCHANGE MEMBRANES

FIELD OF THE INVENTION

This invention relates to ion conducting membranes in general, or specifically without limitation ion exchange and/or proton or hydroxyl conducting membranes for use in electrodialysis as ion selective membranes and in power sources such as fuel cells as proton or hydroxyl ion conductive separators. Specifically, this invention relates to a new method for preparing heterogeneous membranes that have a better combination of improved stability, conductivity and/or selectivity than the prior art ones.

BACKGROUND OF THE INVENTION

Ion exchange membranes (IEM) are used in electrodialysis (ED) as ion selective membranes and in power sources such as fuel cells as proton conductive separators. Basically, two types of IEMs for use in ED are available: homogeneous, that is composed of a cross-linked polymer, which is chemically treated to bind ion exchange groups onto its skeleton. The other type, heterogeneous IEM, are prepared by random filling of a neutral polymer matrix such as polyethylene by tens of micron sized ion exchange particles, and often they are reinforced with a net made of polymeric material such as polyamide or PES.

Whenever the so-called percolation concentration of the ion exchange powder is surpassed, an ion conductive permselective, heterogeneous membrane results.

The normal ion exchange particle concentration in the matrix required to attain reasonable ion transport through the membrane is 50 to 70% by weight. At these concentrations, the membrane specific electrical conductivity is in the range 4 to 12 mScm$^{-1}$. In fact, the above concentrations are the maximum possible for the ED application: an attempt to increase ion exchanger concentration beyond this range for obtaining higher conductivity results in loss of membrane strength and reduced shape stability due to increased swelling when exposed to salt solutions. These properties are important when membranes are used in ED stacks since they limit conditions under which these membranes can be operated.

In power sources, such as batteries and fuel cells selective ion conducting membranes are used. For example particularly with fuel cells, the Nafion membrane (homogeneous cation exchanger) is widely used because of its remarkable proton conductance (0.15 mScm$^{-1}$) and stability in oxidizing conditions. However, the new fuel cell generations require both high proton conductivity and very low permeability to the fuel (for example, hydrogen or methanol fuels). Inorganic or hybrid inorganic-organic composite membranes (both of the heterogeneous type) are today under intensive development for these purposes. One problem encountered in this development is that, as proton conductivity or anionic conductivity in general increase, selectivity to the fuel decreases.

U.S. Pat. No. 3,180,814 discloses a method of increasing conductivity in ion exchange membranes made of synthetic resin through the membrane while the synthetic resin is above its yield point in relation to the magnitude of the electric current. In heat softenable material this may be accomplished by heat development incidental to the passage of the electric current, or by heating of the liquid within which the membrane material is immersed, or by a combination of both. In a material that is not heat-softenable, this may be accomplished by temporary softening, for example by addition of a solvent.

U.S. Pat. No. 5,232,719 describes a process for producing a protein-oriented membrane which is enhanced physically and chemically by orienting protein and cross-linking the oriented protein together.

U.S. Pat. No. 6,287,645 describes a method of forming an oriented film. A target is provided and material from the target is ablated onto a substrate to form a film.

U.S. Pat. No. 5,167,551 describes a process for the production of a heterogeneous ion-exchange membrane, which comprises making a finely powdered ion exchange material with a crystalline polyolefin resin, forming the resultant mixture into a membrane-shaped article and treating this latter with an aqueous solution of an alkali metal or ammonium salt.

U.S. Pat. No. 5,346,924 discloses a method for making a heterogeneous ion exchange membrane, which comprises polyethylene as a binder, incorporates ion exchange resin materials. Said membrane being fabricated using extrusion or other melt processing procedures.

It is a purpose of this invention to produce heterogeneous ion exchange membranes (IEM) for ED or fuel cells wherein the particle or domain threshold concentration needed for conductivity is considerably reduced.

It is another purpose of this invention to provide a method for preparing heterogeneous membranes that are more stable and more conductive than the ones known in the art for the application in electrodialysis (ED) and in power sources such as fuel cells.

It is a further object of this invention to produce such membranes having higher permselectivity, higher conductivity, lower swelling rate and better mechanical stability and processability.

It is a still further purpose of this invention to produce membranes with high proton conductivity and low permeability to fuels such as methanol or hydrogen gas.

It is a still further purpose of this invention to produce such membranes at a reduced production cost.

It is a still further purpose of this invention to produce such membranes having increased ion conductance, in particular proton conductance and permeation rate.

Other purposes and advantages of the invention will appear as the description proceeds.

SUMMARY OF THE INVENTION

One process for producing ion exchange membranes according to the invention comprises the following steps: providing a matrix material, which may comprise or consist of a polymer or a polymer precursor; Introducing in said matrix ion cation or anion exchange particles, or proton or hydroxyl or ion conducting particles or any combination of ion exchange, proton, hydroxide and ion conductivity, or cation or anion exchange polymers, or proton or hydroxyl or ion conducting polymers or any combination of ion exchange, proton, hydroxide and ion conductivity; mixing said particles with said matrix; forming said mixture into a membrane configuration; Ordering by an electric field said particles or ordering by an electric field the domains of said polymer formed by polymer-matrix phase separation upon solvent evaporation or cooling; if said matrix comprises or consists of a polymer precursor or a cross-linkable polymer, said precursor is cured concurrently with said ordering of said particles, or if the matrix comprises a polymer solution or polymer melt the said polymer solution is evaporated or the said polymer melt is maintained and then cooled concurrently with said ordering of said particles.

In another process for producing the ordered membranes of this invention the electric field orders a phase or domain of ion or proton conducting or exchange polymers or oligomers, [or a precursor of such a polymers or oligomers], which form due to the incompatibility [phase separation] between the said polymers or oligomers and the material of the matrix. The final membrane that forms upon solvent removal from a wet film or cooling of polymer melt mixtures which causes ionic polymer/oligomers phase separation from the matrix material (which may be polymers that are organic, inorganic or a mixture of both organic or inorganic) resulting in domains or volumes of conducting or ion exchange materials in a matrix. The application of an electric field across the wet or molten film as the aforementioned phases or domains are forming will order the more polar or ionic charged conducting component. This ordering by the electric field significantly increases the flux and conductivity of the final membrane as compared to a membrane, which are formed without the application of the electric field. This ordering may also significantly increase the selectivity of the membrane because smaller quantities of conductive materials may be used in a non conducting matrix, to achieve the same conductivity as a membrane with a higher content of conducting materials but which has not undergone the invented ordering. The domain size may be on the scale of 1 nano-meter to tens or hundreds of microns.

Since the membrane is formed by a matrix material which is often fluid or flowable or is a solute in a solvent in its initial states, forming said mixture into a membrane configuration includes bringing it to a solid state. If said material is fluid or flowable because it contains a solvent, it is brought to a solid state by evaporating the solvent. If it is in a molten state, it is solidified by cooling. If it is fluid or flowable because it consists of or comprises a polymer precursor that is monomeric or oligomeric or a polymer that should be and is not cross-linked, said precursor is cured. By "curing" is meant herein polymerizing and/or cross-linking to form the desired, final polymeric structure. In preferred embodiments, when the mixture is formed into a membrane configuration the electric field should be applied while the solvent is being evaporated or while the molten polymer is being cooled or while a polymer precursor is being cooled. If a solid membrane is placed within the electrode system it may be heated above its Tg or Tm point to facilitate the particle orientation and then cooled.

The membrane configuration may be a flat sheet, a tubular capillary or hollow fiber, the flat sheet configuration being preferred in many applications.

The said ordering, and possibly polymerizing and curing, operation may produce concurrent effects, such as solidifying the matrix, evaporating any solvent and the like.

In one preferred embodiment, the polymeric matrix is chosen from the group consisting of polyethylene, polypropylene, polyamides, polybenzimidazole, polysulfones, polyether sulfones, polyether ketones, polyether ether ketones, polyvinylidene fluoride, polyvinylidene copolymers, polyvinylidene fluoride copolymers, polyvinylidene chloride copolymers, polyvinyl copolymers, and other engineering plastics, and any other material that is homogeneously mixed with ion exchange material, even at elevated temperatures not exceeding 450° C., preferably not exceeding 250° C., and most preferably not exceeding 150° C., and that is chemically resistant to some extent in acids and bases and to oxidizing environment.

The conductive or/and ion exchange particles may be inorganic or organic or hydrides of inorganic and organic particles. The inorganic conductive or ion exchange particles may be chosen without limitation for silica or silicone dioxide, titanium dioxide or zirconium dioxide and zirconium phosphate. The inorganic materials may also be chosen from non-layered and layered silicates, such as montmorillonite. The organic or inorganic ion exchange particles used according to the invention can be of any commercially available type. Typical organic ion exchange capacity is 2 to 5 meq/g (dry basis) for the cation exchangers and 1 to 3 meq/g (dry basis) for the anion exchangers. The ion exchange particles generally available are mostly from 0.1 to 0.5 mm in diameter, but there are ion exchange particles available as particles of smaller sizes or in the form of powders. The diameter of the particles used, according to a preferred embodiment of the invention, is from 200 to 20 µm, but preferably 50 to 20 µm. However, nano size particles can also be used in other embodiments. In some cases, it is preferred that the particles be spherically shaped beads. Non-spherical particles may also be preferably used in other cases. The ion exchange particles are typically organic materials, but inorganic or hybrid organic-inorganic ion exchange particles may also be used.

The particles are introduced into the polymeric matrix precursor in such a way as to create a mixture as homogeneous as possible. The mixing may be facilitated by dissolving the matrix, if polymeric, in a suitable solvent, or melting it, or treating it with a plasticizer or swelling agent. If a solvent is used, it will be later evaporated, and if the matrix is molten, it will be allowed to solidify. The mixing can be achieved by using a mixing apparatus known in the art, such as mills, mixers, hot presses and the like, depending on the viscosity of the polymer. The concentration of the ion exchange particles in the mixture and in the membrane, viz. the ratio of their amount to the overall amount of the matrix and the particles, is from 10 to 70 wt % and preferably from 20 to 40 wt %.

Additional preferred embodiments are—1) The application of an electric field across a wet film or gel containing a mixture of at least two components in a common solvent, and 2) a melt where at least one component is dissolved in the melt of at least one of the other components. Upon removing the solvent or reducing the temperature while the field is applied results in a solid membrane, wherein the components of the fluid or hot melt film have separate into at least two different phases because of their respective incompatibilities. One phase is dispersed in the other phase which is the matrix, and at least one of the dispersed phases (if there is two or more such phase types) is oriented in the electric field. The phase that is ordered is preferably the polymer or oligomers contains fixed ionic groups sufficient to order it in the electric fielded. The conditions of application of the electric field are determined by the temperature during the evaporation of the solvent, the concentration of the solution of the components as it is related to viscosity, the ionic charge of the polymer that is being oriented and the dielectric constant of the solvent, matrix and other additives.

The electric field range applied to particles is preferably in the range from 50 to 20,000 V/cm and more preferably from 400 to 1500 V/cm. The electric field is a direct or preferably an alternating current field and has a frequency preferably from 5 to 2000 Hz and more preferably from 20 to 150 Hz. The time during which the electric field is applied varies depending on the viscosity of the matrix precursor, its curing time and the size and shape of the particles. It may be applied for periods up to several days but, preferably from several minutes 1 to 10 hours. The field may be applied under vacuum, in inert gases, such as argon, nitrogen and the like, or in air over a range of different relative humidities. The conductivity of the matrix is detrimental to the process and should be minimized.

The invention also produces membranes having new properties, that are, in themselves, an aspect of the invention. It is surprising that the method of this invention produces increased conductivity while retaining high selectivity. By "high selectivity" is meant the selective passage of one species, such as protons for example, with the retention of low passage of other species, such as H2 or methanol for example.

Figure 2A:
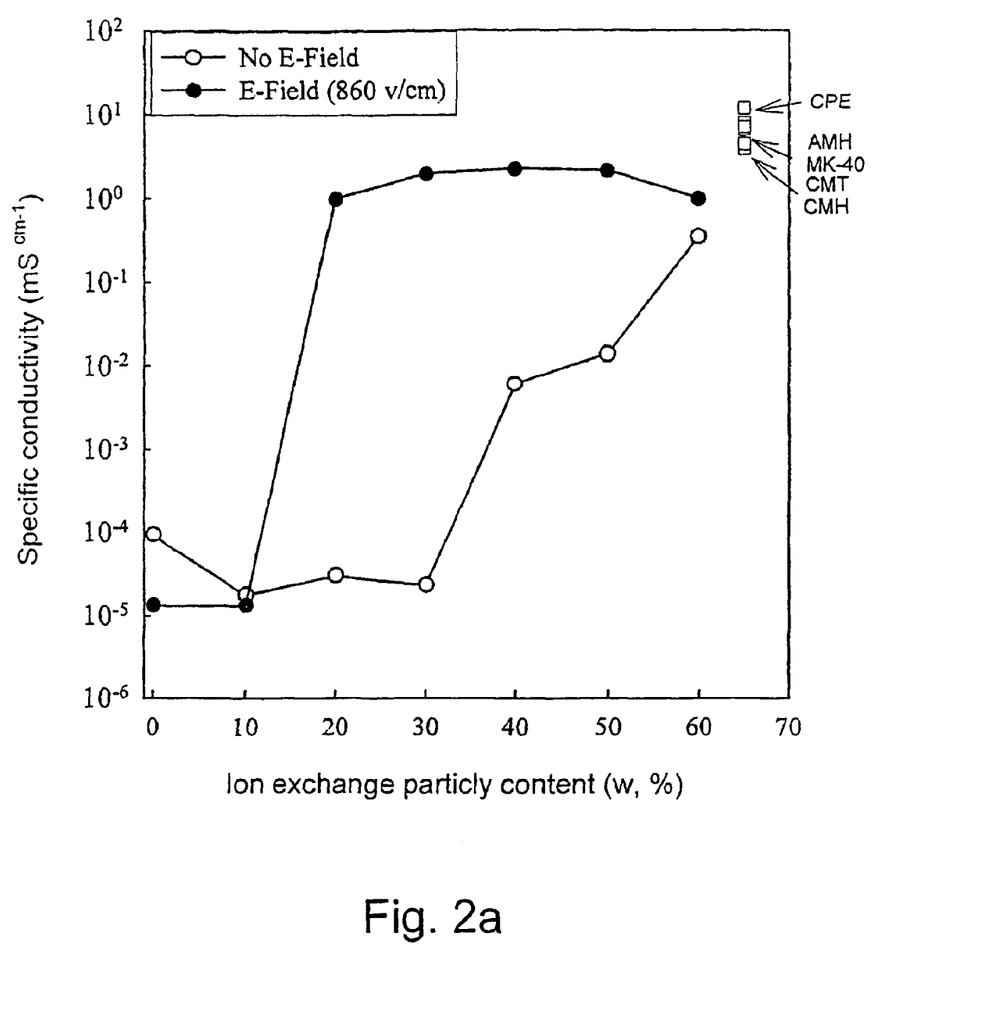
FIGS. 2a and 2b comparatively illustrate the conductivity as a function of the content of ion exchange resin or particles for a membrane according to an embodiment of the invention and a membrane made without the application of an electric field, FIG. 2a relating to spherical resin particles and FIG. 2b to resin powder.
Figure 2B:
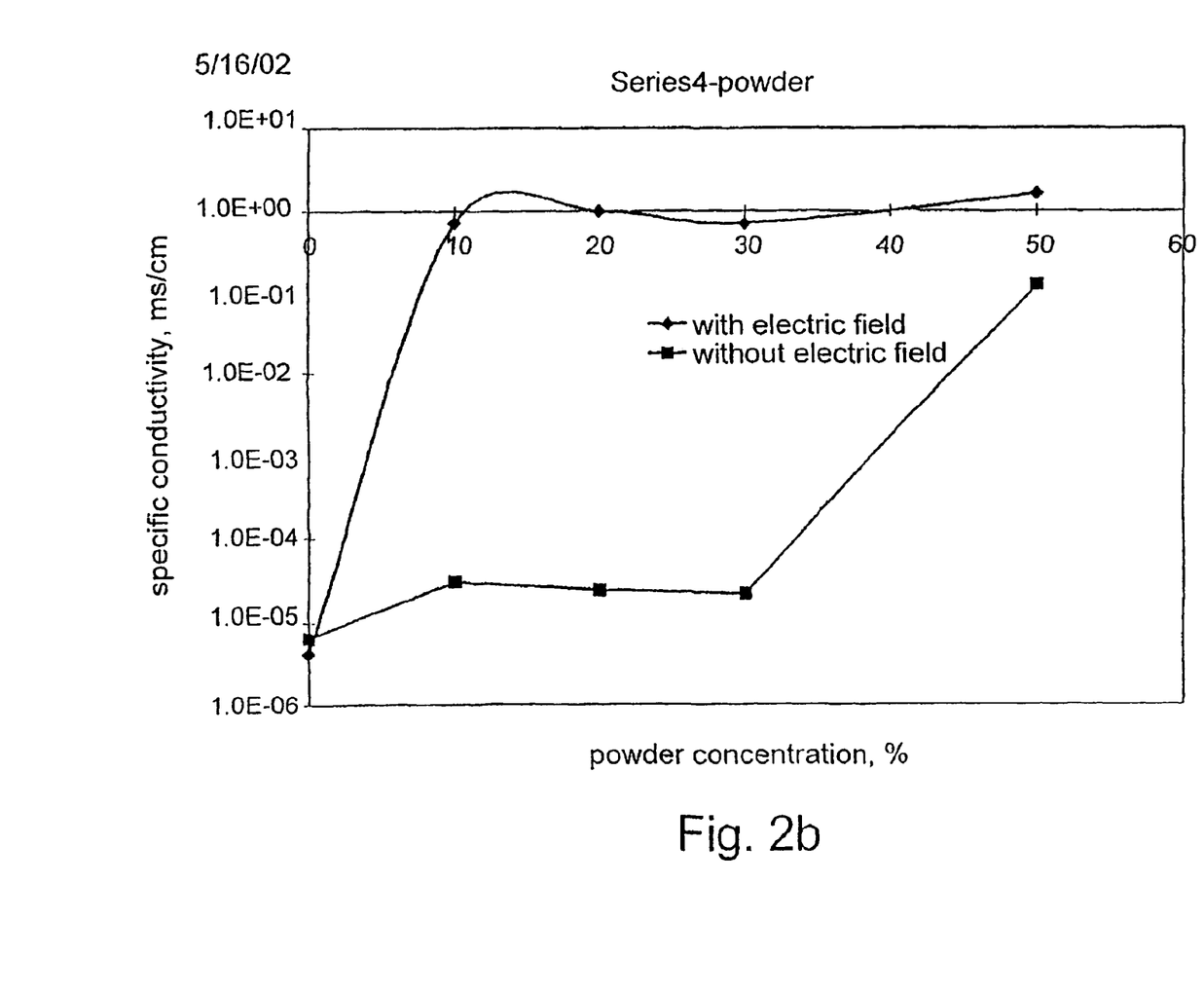
Figure 3:
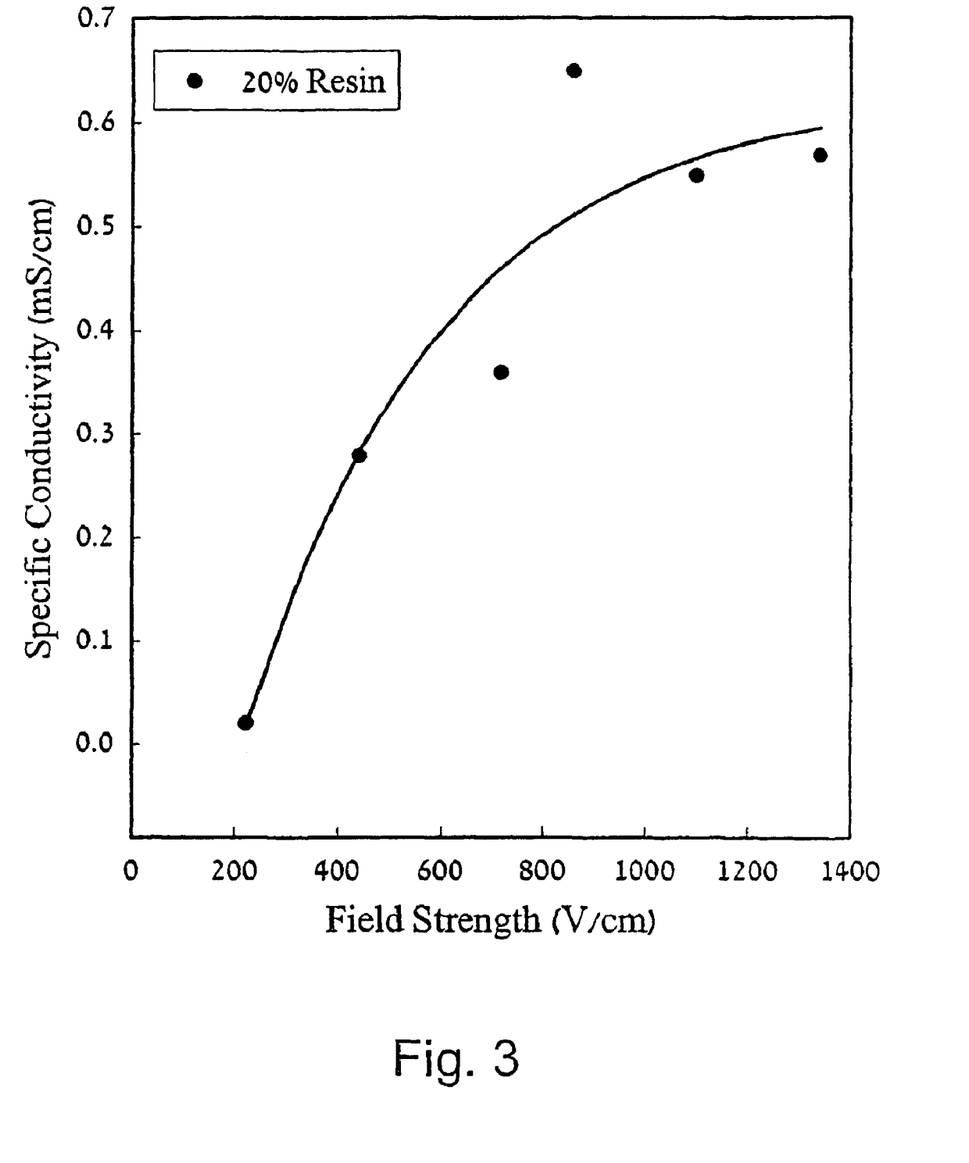
FIG. 3 illustrates the variation of the specific conductivity of an ordered membrane, containing 20% of ion exchange resin, as a function of the strength of the field applied to the membrane.
Figure 4:
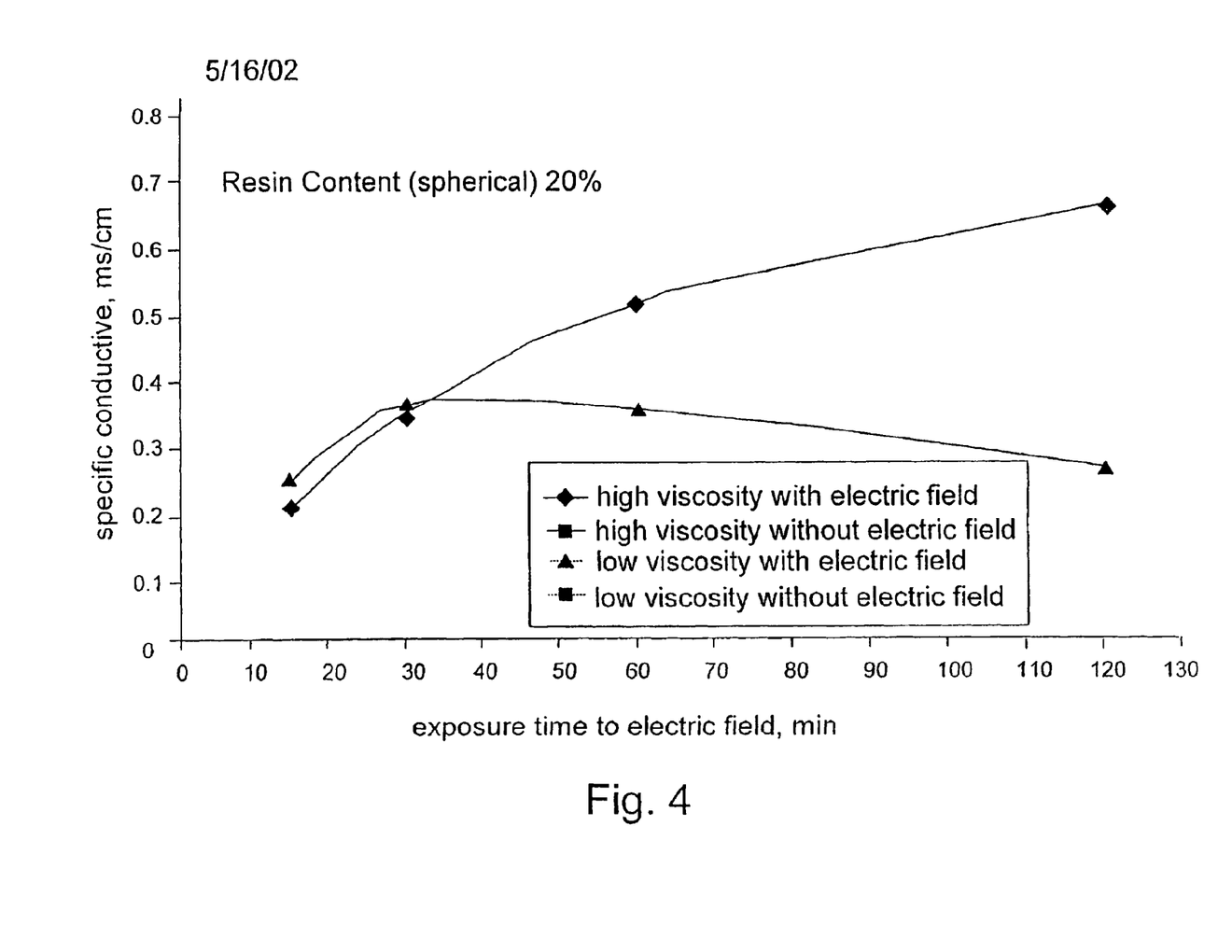
FIG. 4 illustrates the variation of the specific conductivity of an ordered membrane, containing 20% of ion exchange resin, as a function of the exposure time to the electric field.
Figure 5:
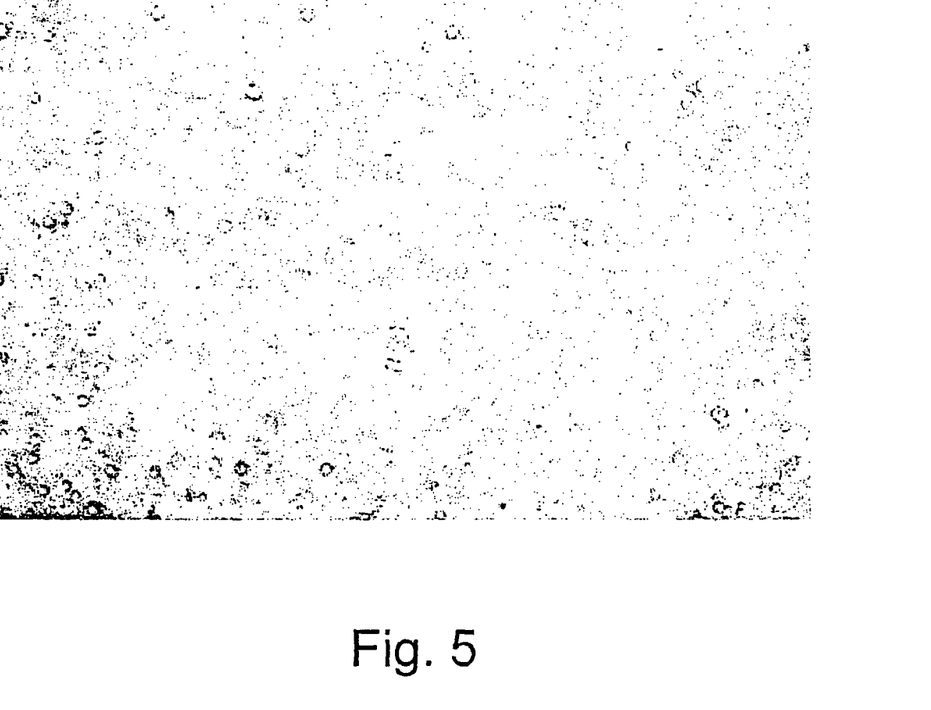
FIG. 5 is a microphotograph of a membrane in the manufacture of which no electrical field has been applied, so that the particles are disordered.
Figure 6:
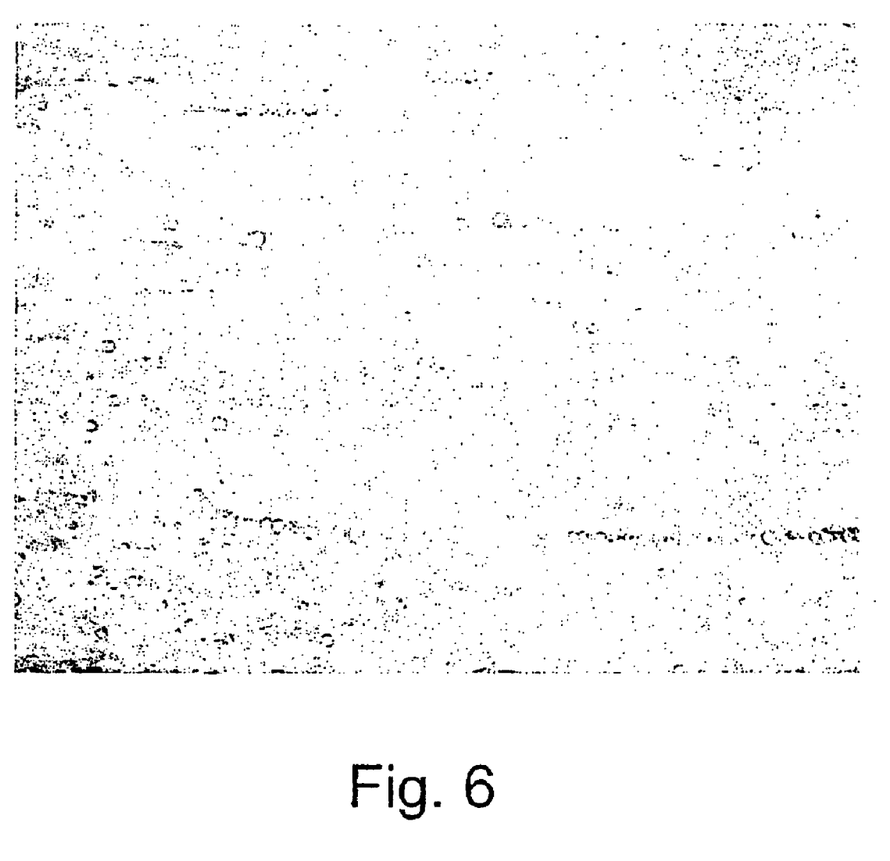
FIG. 6 is a microphotograph of a membrane made according to the process of the invention, whereby the particles are seen to have been ordered.

Conductivity as a function of cation exchange resin content is shown in FIG. 2 together with conductivity obtained with the same compositions but without applying electric field during membrane formation. Also, for comparison, some conductivity values for commercial heterogeneous membranes are shown in Table I.

TABLE I

| Membrane type | mS/cm | Cation/anion exchanger | Producer |
|---|---|---|---|
| CMH | 4 | Cation | Mega |
| AMH | 8 | Anion | Mega |
| CPE | 12 | Cation | US-filter |
| MK-40 | 7 | Cation | Russian |
| CMT | 8 | Cation | Asahi Glass co. |
| Relex CM (CHZ) | 6.7 | Cation | Mega |
| Relex AM (CHZ) | 7.14 | Anion | Mega |
| Relex CHM (CHZ) | 4.5 | Cation | Mega |
| Relex AHM (CHZ) | 4.5 | Anion | Mega |

Permselectivity shows to what extent the membrane is selective to the counter ions. This was measured by the traditional method, namely, measuring membrane potential and comparing it to the calculated one (F. Helffrich, 1962, Ion Exchange, New York, McGraw to Hill Publishing Co.).

The results for membranes with different resin concentrations are summarized in Table II below. The membrane matrix of the membranes of Table II was silicon rubber (RTV). The ion exchange particles were home-made spherical cation exchange particles.

TABLE II

| % Resin in Membrane | Measuring Solutions, N KCl | Ideal Membrane Potential (mV) | Measured Membrane Potential (mV) Ordered | Permselectivity (%) Ordered Membrane | Measured Membrane Potential (mV) "Random" | Permselectivity (%) Random Membrane |
|---|---|---|---|---|---|---|
| 30 | 0.5/0.25 | 15.6 | 15.6 | 100 | — | — |
| 40 | | | 15.1 | 97 | — | — |
| 50 | | | 15.4 | 99 | 15.4 | 99 |
| 60 | | | 15.0 | 96 | 15.1 | 97 |
| 30 | 0.1/0.05 | 16.5 | 16.5 | 100 | — | — |
| 40 | | | 16.0 | 97 | — | — |
| 50 | | | 16.2 | 98 | 16.1 | 97 |
| 60 | | | 15.5 | 94 | 16.2 | 98 |
| 30 | 0.01/0.005 | 16.7 | 16.7 | 100 | — | — |
| 40 | | | 16.9 | to | — | — |
| 50 | | | 16.9 | — | 16.9 | 100 |
| 60 | | | 15.9 | 95 | 15.9 | 95 |

The membrane potential of random membranes (by "random membrane is meant herein a membrane produced without orienting the particles with an electric field) having less than 50% resin could not be measured, due to insufficient conductivity.

Swelling extent, indicating the water content within the membrane, is one of the factors governing the conductivity. It was determined from the differences in weights between the fully wet and the dried membrane with K+ as the counter ion.

Results are presented in Table III below for the ordered and random (not ordered) membranes. It should be noted that in all cases the water content is smaller in the ordered membranes as compared to the random membranes. The membrane matrices of the membranes of Table III were the same as in Table II. The ion exchange particles were the same as in Table II.

TABLE III

| % Resin In Membrane | Weight of dry Membrane (g) | Weight of wet Membrane after 6 days (g) | Water content, % of dry Membrane | Water content, % of dry IE resin |
|---|---|---|---|---|
| 30: | | | | |
| random | 0.3573 | 0.4422 | 23.8 | 79.2 |
| oriented | 0.3903 | 0.4743 | 21.5 | 71.7 |
| 40: | | | | |
| random | 0.3640 | 0.4843 | 33.0 | 82.6 |
| oriented | 0.3537 | 0.4569 | 24.2 | 72.9 |
| 50: | | | | |
| random | 0.3814 | 0.5438 | 42.6 | 85.2 |
| oriented | 0.3802 | 0.5276 | 38.8 | 77.5 |
| 60: | | | | |
| random | 0.4080 | 0.6089 | 49.2 | 82.1 |
| oriented | 0.3839 | 0.5765 | 48.1 | 80.2 |

The thickness of the membranes is preferably 0.2 to 2 mm and more preferably, 0.2 to 0.5 mm.

For the laboratory production of ordered membranes according to this invention, a cell is used which generally consists of two plates of a plastic, e.g. polypropylene, each containing a metal electrode, such as a stainless steel electrode. The two electrodes are separated by another non to conductive sheet, e.g. of Teflon, having a hole therein. The thickness of the sheet and the plan shape and size of its hole depend on the dimensions of the desired membrane. For instance, the sheet may have a thickness from 0.2 to 2 mm and have a round hole of a few millimeters in diameter, e.g. 10 mm. Said sheet separates the two electrodes and contains in its hole the membrane mixture.

If the membrane mixture contains a molten or dissolved polymer or other molten or dissolved substance, the cell should be placed in an oven while applying the electric field and then cooled with the electric field still on.

DETAILED DESCRIPTION OF PREFERRED EMBODIMENTS

Figure 1:
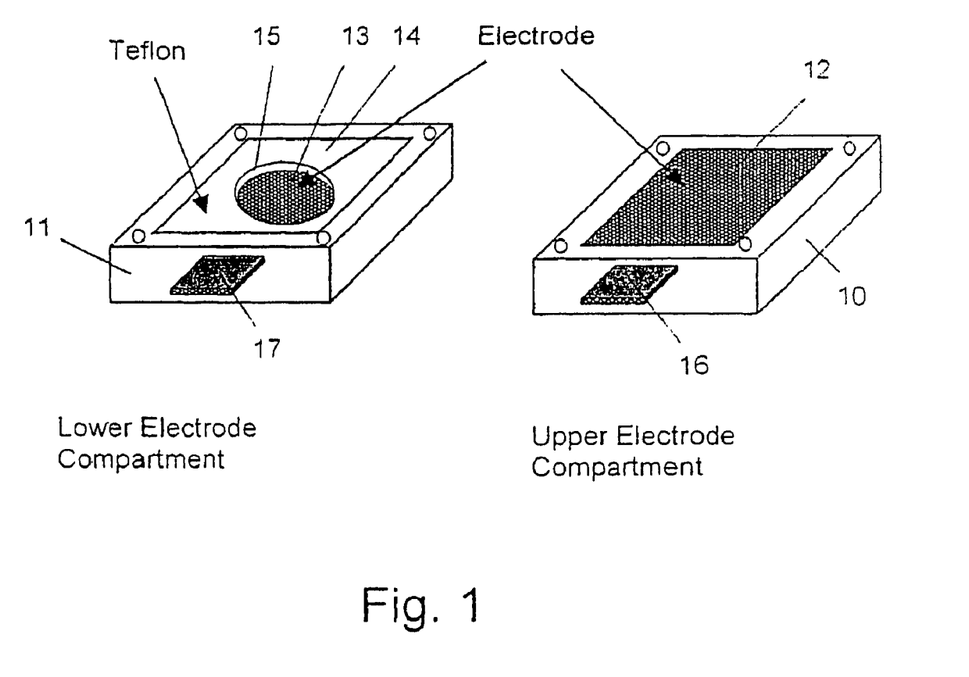
FIG. 1 illustrates in exploded perspective view a cell for the production of membranes according to the invention.

FIG. 1 shows in exploded view a laboratory cell for producing membranes according to an embodiment of the invention. It consists of two plates 10 and 11, made of a suitable non-conductive plastic matter, such as polyethylene. 10 is the upper compartment and 11 is the lower compartment. Compartment 10 houses an electrode 12 and compartment 11 houses an electrode 13. The Teflon sheet has a round hole 15 in the center. The hole is round because the membrane to be produced is intended to be round. If a different to shaped membrane is desired, the hole 15 would have a corresponding different shape. The hole 15 is filled with the mixture of matrix precursor and ion exchange resin, the matrix precursor being fluid or plastic because it has not yet been cured, or is dissolved or molten. Numerals 16 and 17 indicate the two electrical contacts through which the alternating electrical field is applied, from a source not illustrated.

The material, which will form the membrane matrix within which the ion exchange particles are embedded, should have certain properties, preferably: the matrix material and the ion exchange particles should form a uniform mixture, the fabrication into a membrane structure should be easily carried out, the material should be stable during membrane formation, particle orientation, and in use. In particular, the starting matrix material or its precursors may be-a solid in the form of irregular shaped particle, fibers or regular shaped particles such as spheres; a gel; or a low viscosity liquid, an intermediate or high viscosity liquid, or a thermo-elastic material.

In the last case, the liquid precursors to the matrix may be mixtures comprising a solvent into which liquid monomers, oligomers and/or polymers are dissolved or/and dispersed if one or more of the components are not soluble. The solvent itself may be one or more liquid monomers, oligomers or liquid polymers or a common low molecular weight solvent. These components may be in the liquid state slightly below room temperature, room temperature or at elevated temperatures of up to 200° C. but preferably below 120° C.

One important embodiment of this invention are membranes with high selectivity, wherein said property allows a high permeability for one component in a mixture while a second component has a low or very low permeability. This permits the separation of each component into different compartments.

In one preferred application of this invention protons are passed from a first electrode compartment to a second electrode compartment, while the source of the protons, such as methanol or hydrogen gas, is retained in the first electrode compartment. Thus a selectivity greater than in the prior art is achieved by using a relatively low concentration of ion exchange particles in the membrane, but ordering them for high conductivity of the protons. The matrix is chosen to be impermeable to the component to be obtained.

Material candidates may differ in different embodiments of the invention.

1) In a first embodiment the conductive or ion exchange particles may be dispersed in a polymer melt or liquid at elevated temperature formed into a membrane, oriented in an electric field and then cooled to a solid under an electric field to form the conductive membrane.

In one approach of this embodiment, a membrane may be formed by mixing uniformly a powder of the matrix with the powder of ion exchange particles, placing this mixture into a mold, the bottom of which is an electrode, covering the mold with another electrode and heating above the melting point of the polymer. The molten polymer will flow around the solid exchange particles, and the ion exchange particles will orient themselves in the electric field. The heat is then removed and the polymer solidifies to give the desired membrane.

In another variant of this embodiment, a preexisting heterogeneous membrane is placed between two electrodes, heated above the Tg or Tm of the matrix material, the electric field is applied, then the membrane is cooled to give the oriented membrane. The particle or domain heterogeneity may be in the range of 1 nano-meter to tens or hundreds of microns.

2) In a second embodiment the ion exchange or conductive particles may be dispersed in a viscose liquid of monomers, oligomers or/and polymers, at room or elevated temperature, be formed into a membrane configuration, the ion exchange particles be oriented in an electric field wherein the components of the solution undergo reaction during the time the electric field is applied, to form a solid matrix with the oriented particles fixed within the matrix.

3) In a third embodiment, the ion exchange or conductive particles may be dispersed in a viscose liquid comprising a polymer dissolved in a solvent, be formed into a membrane configuration, be oriented in an electric field wherein the solvent is evaporated during the time the electric field is applied, to form a solid matrix with the oriented particles fixed within the matrix.

4) In the fourth embodiment, the application of an electric field across a fluid film or a hot melt or gel containing a mixture of at least two components in a common solvent, or a melt where one components is dissolved in the melt of the other component. Upon removing the solvent or reducing the temperature while the field is applied results in a solid membrane, wherein the components of the wet or hot melt film have separate into at least two different phases because of their respective incompatibilities, brought about by evaporating the solvent or cooling. One phase is dispersed in the other phase which is the matrix, and at least one of the dispersed phases is oriented in the electric field. The phase that is ordered is preferably the polymer or oligomers characterized by conductivity ion exchange or ion conducting or proton conducting properties, inside the other phase which is the said matrix.

In the fourth aforementioned embodiment wherein in polymer-polymer incompatibility is used to form an ordered heterogeneous membrane the casting solution may comprise a solvent or mixture of solvents, non solvents and surfactants or emulsifiers or coating agents which form steric barriers between phases, a polymer, which will form the matrix or a mixture of two or more polymers which will form the matrix, a polymer or oligomers which contains ion or proton conducting groups in the backbone and or as pendants or a combination of polymers and oligomers which contains groups which are ion or proton conducting in their backbone or pendants, and optionally other polymers which may act as compatiblizers between the conducting polymer or polymers or only some of the conducting polymers or oligomers.

In one preferred embodiment of the fourth aforementioned embodiment there is a co-solvent for two different polymers one of which will form the matrix and the other will form the ion or proton conducting channels. The one preferred case the proton conducting polymers will be the minor component and the matrix will be the major component and both polymers will be incompatible with each other. For example the proton conducting polymer may be from 5 to 80% of the total weight of the final membrane in the more preferred case will be from 10 to 50% or from 10 to 30% in order to achieve a combination of high flux and conductivity. In solution the two polymers may be completely miscible within the solvent mixture or in some cases they may be partially miscible. When the solvent evaporates both components being incompatible with each other will begin to phase separate into a matrix rich phase and ion or proton conducting rich phase.

In another embodiment the ion conducting polymer is formed in the solution containing the matrix polymer and the solvent. In this case the solution contains polymers for the matrix, a common solvent, a monomer with ion exchange or proton conducting groups, an initiator and optionally a crosslinker.

The role of the matrix is to stabilize the ordered ion or proton conducting channels so that that they do not randomize after the electric field is removed and especially in operation in a given application. The matrix material also reduces the swelling of the conducting polymers enhancing selectivity. In a preferred case the matrix polymer will be water insoluble and have a low degree of swelling in water (preferably less than 20% and more preferred less than 10%), and in aqueous solutions or mixtures or solutions with other solvents or liquids or solutes such as alcohols, ethers, ketones, aldehydes acids, bases, oxidants and reductants. The matrix components may be non-crosslinked by covalent chemical bonds or crosslinked covalently. The crosslinking may occur during the formation or after the formation of the film. The matrix polymer may be a homopolymer or a co polymer which may be alternating or syndiotactic or isotactic or atactic. If the polymers are block copolymers or random or alternative copolymers the different monomers may have different groups. The groups on one type or all types of the monomers may have a structural role and may interact with the other components in the film such as the proton conducting polymers or networks. In general the matrix materials and polymers should have relatively low dielectric constants as compared to the conducting polymers. The latter of which have ionic groups or proton donors ns proton acceptors. The matrix material may have polar groups such as of carbon halogen groups such as carbon fluorine being a preferred material. Other polar groups are aromatic ethers and ketones, and sulfones. The idea being that the particle or domain materials as compared to the matrix material should have different dielectric properties resulting in dielectric polarization of the particles or domain in the external electric field with subsequent interaction between the dipoles leading to ordering of the phases in the direction of the applied field. The particle or domain forming materials should be chosen as to ensure phase separation with the matrix as the solvent is evaporating because of polymer-polymer incompatibility.

For the fourth aforementioned embodiment the proton or ionic conducting polymer is preferably not soluble in water, water alcohol mixtures or alcohols, but may swell to different degrees. Alternatively the polymer that is added to the solution may be soluble in water or various aqueous solvent solutions and solvents but after it forms in the matrix it may be crosslinked by covalent bonds, or a combination of polar and hydrophobic interactions with itself or with other components such as the matrix or other polymers such as complexing polymers or polymers used to compatiblizers the conducting polymers and the matrix. The proton conducting polymer may be a homopolymer or a co polymer which may be alternating or syndiotactic or isotactic or atactic. The groups that conduct ions or protons may be acid groups such as sulfonic, carboxylic sulfonamides, metal oxides such as silica oxide, zirconium oxide titanium oxide, etc. Proton conducting groups may also be based on amines or ethers or amides or imines etc. If the polymers are block copolymers or random or alternating copolymers and the different monomers may have different groups. One of the monomers may have the proton conducting groups based on acid functions such as sulfonic groups. Other groups may be present which may or may not facilitate proton or ion conductivity such as amine groups or other hydrogen bonding groups such as amines or ethers or amides or sulfides. Alternatively the other groups may be structural groups whose role is to stabilize the polymers against leaching or compatibilize the polymer with the matrix.

For the fourth aforementioned embodiment the role of the matrix is to stabilize the ordered components of the ion or proton conducting channels so that that they do not randomize after the electric field is removed and during operation. This is especially the case for water swelling and or water-soluble ion/proton conducting polymers. Such polymers may in addition be further stabilized by crosslinking between themselves or by being covalently bonded to the matrix to form a crosslinked network. Other polymers which are water soluble are preferably crosslinked after they are orders.

As the electric field is being applied and the solvent is being evaporated and/or the solution is being cooled down and/or the melt is being cooled down it is preferred that matrix material as it is forming and does not adsorb most of the electrical energy which should go into orienting the ionic or more polar conducting polymers and there domains as they form due to polymer-polymer in compatibility with e the matrix. Crosslinking may be done by chemical additives or ionizing radiation or by heating under a vacuum to form crosslinks. Method of crosslinking: sulfonic groups are heated under vacuum at 150° C. for over night to form sulfone groups between polymer chains.

To enhance solubility of the conducting channels in the solvent or solvent mixtures, the counter ion or polyelectrolyte may be chosen to enhance solubility. For example some of the cations of the sulfonic groups may be in the H form or ammonium form, or the bases may be non protonated if polyamines are used. [For a list of conducting polymers which are incorporated into this patent by reference are found in "Solid Polymer Electrolytes by Fiona M. Gray 1991 VCH Publishers].

For the fourth aforementioned embodiment in addition to the matrix polymers and materials and the ion/proton conducting polymers or oligomers other polymers or oligomers or low molecular weight additives may be present so as to facilitated ordering of the conducting polymers in the matrix, and/or compatibilize the conducting domains with the incompatible matrix and or to crosslink the conducting polymers after they are ordered or to crosslinked the matrix after film formation. Further additives may be added to enhance the conductivity of the conducting polymers. These additives may by LMW or intermediate molecular weight or high molecular weight and may be proton donors or proton acceptors. The additive may also be used to enhance the polymer-polymer incompatibility of the conducting polymer and domains composed of such polymers as they are formed The solvent(s) in one preferred case should dissolve all the components such as the polymer forming the matrix and the polymer which will form the conducting domains, as well as any additional additives. The dielectric constant of the solvent should be relatively low so that it does not prevent orientation of the conducting polymers or oligomers due to adsorption of the electrical energy of the applied filed but it should be sufficient to dissolve polar polymers and even ionic polymers. It may be in some cases that to dissolve the components of the membrane a mixture of solvents need to be used to achieve the required solubility parameters suitable for all the components. The boiling point of the solvent may be from RT to 300° C. though the preferred case would be between 40 to 220° C. Some preferred solvents are NMP, DMF, THF, Acetone, toluene, toluene/alcohol mixtures, alcohols such as ethanol, propanol, butanol and their isomers. Substantial conductivity of the solvents is determined to the process as this drastically reduces the field strength inside the membrane or might cause over heating. It is therefore highly preferable to use non-polar solvents whereas the polar solvents should be dry.

Non solvents may be added to increase the solubility of one component while it may reduce it for the other component. For example the solvents which dissolve the highly non polar matrix may not dissolve the polar conducting polymer and in this case a small amount of a polar solvent may be added. If two or more solvents are added with different solvating powers then as one of the solvents is evaporated faster than the other solvating power of the mixture changes and may improve or it may decrease giving different types of domain formation inside the matrix.

The components of the solution may be completely miscible or partially miscible giving partial separation of phases, partial separation or only one phase. This is a function of the solubility power of the solvent and or solvent/non-solvent mixtures and the temperature of the solution at which the evaporation is being carried out. Also the nature of the final film formed depends on the history of the solution. Solutions which are prepared at elevated temperature are stirred and optionally heated to achieve a uniform solution. Upon standing at lower temperature such solution may form separate phases as indicated by cloudiness or precipitation. Thus the time the solution is cast after it is prepared is important in determining the nature of the domains formed inside the films. Since the wet film is in contact with the electrodes or with the solvent environment solvent which can under readily oxidation reduction reactions, such as water are not desirable in large quantities, but may be tolerated in smaller quantities. The viscosity of the solution may vary from free flowing solutions to highly viscose pastes that have to be applied to the electrode (s) by extrusion.

The wet film thickness will depend on the thickness of the final dried film, and the concentration of the components in the solution. Typical concentrations of 5 to 35% solids should be cast at 500 microns to 30 microns in order to form a dry film of less then about 100 microns and preferably in the range of less than 50 microns. For self standing membranes the thickness will depend on the selectivity of the membrane and reduction of flux across the membrane of feed components such as for example hydrogen or methanol in fuel cell applications, or to enhance selectivity between ions in membranes used for electro-dialysis applications. In state of art fuel membranes such as Dupont's Nafion, thicker membranes have to be use to limit crossover than about 200 to 150 microns maybe used if the conductivity of the membrane for the desired component in the feed such a adsorption is high enough. It is desired to have thin membranes and its one of the advantages of this invention is that highly selective thin membranes can be made because lower concentration of conducting polymers would be used, that would otherwise reduce selectivity. Such thin membrane may also improve conductivity.

Processing the solution before casting or before application of the electric field can be used to adjust the final morphology of the proton conducting domains in the matrix. If the solution is heated before casting then the solution may be more homogenous and when the field is applied and evaporation started and slower domain formation occurs. Alternatively if there is some evaporation and the solutions is brought closer to phase separation then other domain morphologies will occur. In addition the solution may be cooled to initiate phase separation then the electric field is applied and evaporation is carried out.

Hot melts where the melt polymer is the solvent and dissolves the conducting polymers. Instead of solvents the matrix material may be melted at elevated temperature and into this melt additional material such as the conducting polymer may be dissolved. When the melt is extruded or otherwise formed into a membrane film it is cooled and the conducting polymer forms a second domain compared to the matrix polymers because of phase incompatibility.

Mode of Evaporation for Solvents or Temperature Reduction Scheme:

In one preferred mode of membrane or film formation is to cast a wet film at room temperature, apply an electric field across the membrane, and evaporate the solvent under stream of inert gas. Another mode is to cast the wet film, apply the electric field and evaporate the solvent under a stream of inert gas without raising the temperature. The stream of inert gas may be substituted by a vacuum in some cases under conditions which do not form bubbles in the membrane.

Electrodes and Their Configuration

The electrodes can be flat and the wet or molten film is placed in between the said electrodes to form a flat oriented film. In one case the wet film is cast onto the surface of one of the electrodes and passed under the second electrode with a small air gap. In another case there is no air gap and both electrodes are making contact with a given side of the wet or molten film. If the electrodes are placed on a molten film which will be cooled then both electrodes may be dense with very low vapor or gas transmission. Or the electrodes may be porous if the pore size and hydrophobic/hydrophilic balance is such that there is little penetration of the molten material into the depth of the electrodes. If the electrodes are placed on a wet film which requires solvent removal then the bottom electrode upon which the wet film is cast may be dense with very low vapor or gas transmission, or it may be porous if the pore size and hydrophobic/hydrophilic balance is such that there is little penetration of the wet film into the depth of the electrodes. The top electrode if it does not contact the surface of the wet film, may be either dense or porous or may be a net. If it is placed on the surface of the wet film and evaporation of the solvent from the film is required then it should be porous electrode or a net and float on the surface of the film. In another embodiment the electrode configuration may be a cylinder in which an extruded hollow fiber is passed and this cylinder forms one electrode, and the other electrode is a wire going through the lumen of the fiber. The outer cylinder may contact the outer surface of the extruded HF. The solvent from the wet film is evaporated through the outer surface and the porous electrode which is the outer cylinder or through inert gas flow threw the fiber s lumen. If the HF is molten then a solid membrane may form by cooling.

Another preferred electrode arrangement is two electrodes with the membrane resting on one electrode and an air gap between the second electrode and the film surface. Resting on the top surface of the wet film of molten film may be a conductive net or porous plate which will float on the surface. This conductive net or plate in contact with the film surface then becomes the second electrode. In this configuration the electrodes may be separated form the membranes or may be a permanent part of the membrane.

Distance Between Electrodes

If the electrodes are placed on either surface of the wet or molten film then their distance will be that of the initial thickness of the wet or fluid film and molten layer and this distance will decrease as the solvent is evaporated from the wet film or as the molten film is cooled. In general the wet/fluid or molten film will have a thickness from 10 to 1000 microns and preferably 20 to 500 microns and most preferred between 20 to 200 microns. Thus the distance of separation of the electrode is the thickness of the film the electrodes are contacting. If there is an air gap then the distance between the electrodes is the thickness of the air gap and the membrane. Air gaps of up to 2 mm can be used and if the membrane thickness is only 0.1 mm then part of the total voltage drop will fall on the air gap and the field in the solution or melt will be reduced. In that case the applied voltage should be larger.

The space gap may have flowing gas which is inert in the electric filed to facilitate removal of the solvent. The gas may be dry nitrogen, argon or neon. Dry gas is preferable to gas with water vapor To a lesser extent dry air may be used at low voltage. In some cases when the solvent has a low boiling point a stagnant non flowing inert gas may be present open to the environment.

Temperature and Time of Wet Film Driving:

When the electric filed is applied across the wet film then sufficient heat is applied to remove the solvent, together with a flowing stream of gas or in some cases without a flow of gas, or in the presence of a vacuum. For a solvent with a low boiling point the temperature may be kept at ambient conditions with flow gas. Low boiling solvents will not be kept in a vacuum because of bubbling. In the case of a molten film then the temperature of keeping the material in the molten state will be selected. For example, between 70 to 200° C. The electric filed is applied and the temperature may be reduced at different rates. In some cases the high temperatures will be kept for an extent period and then slowly drop or in other cases it will drop rapidly to a given level.

The membrane thickness may be between 5 to 500 microns, preferable between 10 to 150 and most preferred less than 100 micron to give higher conductivity consistent with mechanical strength. The films may be self-supporting or they be further reinforced by a net fiber or supported on a porous support. The porous support may be symmetric or asymmetric with respect to pore size from one side to the other-side. The pore size may be characterized as MF, UF or NF as is well known in the state of art. In one preferred embodiment the ordered film on the porous support is on the side with the smaller pores.

Domain Shape and Size of Conducting Channels:

The conducting or permeating domains are formed by the by phase separation under an electric field. These domains aggregate to form conducting channels within the matrix. The morphologies and shapes of the individual domains and their aggregates may be as irregular shaped particle, fibers or regular shaped particles such as spheres, tubules, plates, helices, ribbons, or any combination of these configurations or shapes. Size of the domains may range from a few molecules to several moles. In terms of size they may have effective diameters of 1 nanometer to microns and millimeters. In the case of fibers fiber length they may be 10 nm to millimeter lengths with diameters of 1 nanometer to several hundred nanometers. In some cases small domains may aggregate to form conducting channels, wherein the domains that aggregate may have the same approximate shape and size or in other cases different shapes and sizes.

In the aforementioned first embodiment, wherein ion exchange particles are dispersed in a polymer melt or liquid at elevated temperature, formed into a membrane, oriented in an electric field and then cooled to form the conductive membrane, the membrane matrix material may be taken from thermoplastic or thermo-elastomers. These comprise polymers that are solid at the temperature of use but may be molded at elevated temperatures, above which they may convert into the liquid crystalline or thermo-elastic state, which will flow under pressure. Some such materials are polyolefins and polyolefin ionomers (polymers containing a low level of ionic groups in the hydrocarbon backbone), thermoplastic elastomers and thermoplastic condensation polymers.

Non-limiting examples of materials which may be used in this invention as the matrix material in embodiments 1, 3 and 4 are:

Polyethylene and polypropylene copolymers with melting points from 60 to 200° C., but preferably from 70 to 130° C. Some examples are polyethylene of low and medium density with Tm between 90 to 130° C. and polyethylene with mp between 90 to 130 C and melt viscosity 0.1 to 80 poise, polyethylene co- or ter-polymers with monomers such as 1-butene, hexene, butyl acrylates and butylacrylate-co-carbon monoxide, polyethylene ionomers especially those based on polyethylene copolymers with carboxylic groups or such as acrylic acid, and/or methacrylic acid, maleic acid. Examples of such polymers are metal salts of polyethylene-co-methacrylic acid, maleated ethylene-propylene-diene rubber, maleated high-density polyethylene, maleated polypropylene, polyethylene-co-acrylic acid and carboxylated acrylonitrile-butadiene rubber, and carboxylated nitrile rubber. The counter ions of the aforementioned polymers may be chosen from a range of cations. Some examples of cations are H+, Na, K, Li and Zn.

Non-ionic thermal plastic elastomers and plastics such as poly(butadiene-co-styrene) polymers and ethylene copolymers with 1-butene, vinyl acetate and ethyl acrylates.

Other thermal plastics which may be used in this invention are: ethylene-propylene and its copolymers, such as styrene acrylonitrile, acrylonitrile-butadiene-styrene copolymers, and styrene-alpha-methyl styrene copolymers, polyvinyl chloride and copolymers such as vinyl chloride-vinylacetate, vinyl chloride acrylonitrile and vinyl chloride, vinylidene chloride, vinylidene chloride and its copolymers with acrylonitrile and acrylates, and methyl methacrylate.

Under condition where high temperatures can be applied to melt the polymers forming the matrix then the following can be used: polyinylidene fluoride (PVDF), polytetrafluoroethylene (PTFE), poly hexafluropropylene (PHFP), polychlorotrifluoroethylene (PCTF), and co and terpolymers of the above, polysulfone, polyether sulfone, polyphenylene sulfone, polyether ketone, polyether ether ketone, and other variations of polyether ketones and polysulfones, polyphenylene sulfide, phenylene sulfone and variations of sulfide and sulfone in the same polymer, polyether based on polyphenylene oxide such as 2,6 dimethylphenylene, aromatic polyether imides, polyether imide-amide, aromatic polyamides and aromatic aliphatic polyamide combinations.

The above polymers may be used in the aforesaid first and fourth embodiment as the matrix polymer and many of them are soluble in solvents at room temperatures and may be used in the aforesaid third embodiment.

In the said second and different aspects of the fourth embodiment, wherein for the second embodiment the ion exchange particles may be dispersed or in the fourth embodiment where the ionic or conducting polymer may be dissolved, in a viscose liquid of monomers, or reactive oligomers or polymers, at room or elevated temperature, formed into a membrane configuration, the ion exchange particles added (second embodiment) or the domains formed by polymer-polymer incompatibility (fourth embodiment) are oriented in an electric field; wherein the components of the solution undergo reaction during the time the electric field is applied to form a solid matrix the oriented particles or domains fixed within the matrix, the membrane matrix material may be chosen from room temperature crosslinking and thermoset materials such as epoxies, silicones, acrylates, etc.

Examples of such thermoset materials are vinyl monomer systems that polymerize and crosslink through their radicals. Various monomers can undergo polymerization in the presence of initiators. When a multifunctional monomer is included, crosslinking will occur and result in a stable matrix. Different initiators can be used, which begin polymerization at room temperature upon their addition to the monomer solution or are activated at elevated temperatures. Still other systems can contain monomers, which can undergo thermal polymerization without crosslinkers.

An example of a system, which undergoes spontaneous thermal polymerization, is styrene to polystyrene. If the crosslinker divinylbenzene is included in the mixture then a crosslinked matrix will result. These polymerizations can be carried out in the bulk or in solution with a common solvent. These and other thermo-polymerizing systems are part of the invention.

Low molecular weight hydroxy-terminated polydimethylsiloxanes maybe be converted to rubber-like products by reaction with alkoxy silanes such as tetraalkoxy silanes, trialkoxy silane and polyalkoxysiloxane. By choice of catalyst cure may be effected at room temperature in times ranging from 10 minutes to 24 hours.

Another approach to achieving crosslinked products from silanol-terminated gums is the cure of polysiloxanes containing silanic hydrogen. This reaction requires the presence of metalloic salts.

Epoxy condensations may be used as membrane matrix materials. They include three major types 1-cycloaliphatic epoxy resins, epoxidized oils, and glycidyl resins. Epoxy resins based on bus phenol A and epichlorohydrin are the most commercially useful resins.

Polyamides and derivatives such as polyamidoamines are used as curing agents instead of polyamines to achieve special properties such as lower toxicity improved flexibility longer pot life lower exotherm. The curing is not due to amide groups, but rather to secondary amine and terminal amine groups.

Polyaddition can be carried out with phenols and thiols. Phenols are primarily used to make HMW epoxy resins by reaction with bisphenol A and diglycidyl ethers of bisphenol. There are two reactions: 1) phenol with the epoxy and 2) hydroxyl group generated from the epoxide-phenol with another epoxide.

Like phenols, thiols react with epoxy groups to form hydroxy sulfides. In the presence of suitable catalysts the epoxy-thiol reactions are several times faster than epoxy amine reactions particularly at low temperatures. The reactions are very selective without side reactions. The reaction can be accelerated in the presence of amines and two alternative reaction routes have been suggested to explain the formation of sulfide ions intermediates, which then reacts with the epoxy.

Curing can be carried out with amino resins, which comprise mainly urea-formaldehyde (UF), melamine-formaldehyde, guanamine-formaldehyde usually prepared by hydroxymethylation of urea, melamine, or benzoguanamine.

A phenol-formaldehyde resin formed from an excess of formaldehyde is called a Resol and that formed an excess of phenol is called a Novalac. Resols are a mixture of monomeric and polymeric hydroxymethylphenols made under basic conditions.

Thermosetting Acrylic Resins (TSA) have the advantage that the polymer can be made with different functional groups, which can then be cured with several different curing agents and provide specific properties such as controlled crosslinking density. These functional groups can be carboxyl (acrylic acid methacrylic acid itaconic acid) epoxide groups (glycidyl acrylates, glycidyl methacrylate, allyglycidyl ether), amines (dimethylaminoethylmethacrylate, vinyl pyridine, t-butylaminoethyl methacrylate, anhydrides (maleic anhydride, itacanoic anhydride) hydroxyl groups (allyl alcohol, hydroxyl-methyl methacrylate, hydroxy propyl methacrylate, hydroxypropyl acrylate) amide (acrylamide, methacrylamide, maleamide) amide derivatives (N-hydroxy methylacrylamide, etc) isocyanates (vinyl isocyanates, allyl isocyanates). Acrylate monomer crosslinker methyl acrylamidoglycolate methylether has a vinyl group for polymerization and an activated methyl ester and a methyl ether. The latter group can be crosslinked with amines at RT or with alcohols under acid catalysis. This monomer is designed for RT cure coatings without the use of toxic isocyanates and acid cure coatings without formaldehyde release.

Moisture curing system based on isocyanate-oxazolidine chemistry for various TSA systems such as alkyd-MF (melamine formaldehyde), acrylic polymer-epoxy, acrylic-MF, hydroxymethylamide-acrylic, urethane-acrylic. The acrylic polymer-epoxy combination has the best chemical resistance and good toughness.

Materials cross-linked through auto-oxidation can also be used. In the aforesaid third embodiment, in which the ion exchange particles are dispersed in a viscose liquid comprising a polymer dissolved in a solvent, formed into a membrane configuration, oriented in an electric field wherein the solvent is evaporated during the time the electric field is applied to form a solid matrix, the oriented particles being fixed within the matrix, the following matrix materials may be used:

Fluorinated polymers which may be used as matrix materials in this invention are: polyinylidenefluoride (PVDF), polytetrafluoroethylene (PTFE), polyhexafluropropylene (PHFP), polychlorotrifluoroethylene (PCTF), and co- and ter-polymers of the above, such as PVDF-co-PTFE, PVDF-co-PTFE, PVDF-co-PHFP, PVDF-co-PCTF, Poly(perfluoroalkyl dioxides) as a homopolymer and copolymers with other fluorinated monomers such as vinylidene fluoride or tetrafluoroethylene.

Other materials that can be used are those known as engineering plastics, especially those made using condensation polymerization, for example, polysulfone, polyphthalimidazole, polyether sulfone, polyphenylene sulfone, polyetherketone, polyether ketone, polyether ketone ether ketone, and other variations of polyether ketones and polysulfones, polyphenylene sulfide, phenylene sulfone and variations of sulfide and sulfone in the same polymer, polyethers based on polyphenylene oxide such as 2,6 dimethylphenylene, aromatic polyether imides, polyether amide-amide, aromatic polyamides and aromatic aliphatic polyamide combinations, polybenzimidazole, halomethylated derivatives of the above polymers on the aromatic or aliphatic groups.

Many different solvents can be used and can be chosen from halogenated hydrocarbons, fluorinated hydrocarbons, alcohols, esters amines, lactams (N-methylpyrrolidinone), lactones, amides (dimethylformamide, dimethyl acetamide), ethers, dimethylsulfoxide, etc. These solvents may be used to dissolve many of the aforementioned polymers and such solutions may be used in the aforesaid third embodiment. In summary the matrix materials, and solvents described for the third embodiment may also be used as matrix and solvent material for the fourth embodiment.

The conducting polymers or oligomers for embodiment 4 of this invention may be chosen the ionic or polar derivatives: a) completely fluorinated (perfluorinated) polymers or b) partially fluorinated or polymers or c) non-fluorinated. In one preferred case the conducting polymer is made from sulfonated fluorocarbon polymers. Examples of different conducting polymers are:

1) Polymeric materials such as sulfonated polyetherketones, polysulfones and polyethersulfones, sulfonated polyphenylene oxide and graft polymerization (ex polytetrafluoroethylene of polyethylene-co-tetrafluoroethylene or PVDF with grafted polystyrene. Plasma polymerization (ex. perfluorinated compounds such as fluorobenzene followed by sulfonation, phosphorylation or carboxylation or plasma polymarization of phosphonic acid with tetrafluoroethylene In general cation exchangers based on sulfonic acid also included are however cation exchange polymers based on other groups (e.g. —PO2H2, —CH2PO3H2, —COOH, —OSO3H, —OPO2H2, —OPO₃H2, —OArSO3H) and those based anion exchange membranes based on amino and quaternary ammoniums.

Copolymers of tetrafluoroethylene with perfluorinated sulfonic acid polymer membranes of the same type. For example Where n is 0 to 2 and m is 2 to 5

2) Polymeric materials such as sulfonated Polyphenylene sulfides, polyetherketones, polysulfones and polyethersulfones, polyphenylquinoxiline, sulfonated block polymers (polystyrene-ethyelen/butylene-styrene which forms sulfonated domains another example of which is sulfonated Kraton). Variations of the sulfonation procedure where in the monomer of polysulfone is first sulfonated and the sulfonic groups are on the sulfone moiety rather than the aromatic ether. Cation exchange polymers made from sulfinated and sulfonated polysulfonaes and polyether sulfones poly(trifluorostyrene) ionomers 3) Mixed groups on a chain aromatic polymers which have been nitrated and the sulfonated to make cation exchange polymers. The nitro groups may be optionally reduced to amines.

4) Polymers of grafted sulfonated beta trifluorostyrene in a PTFE-HFP matrix, polyvinyl alcohol with sulfonated polystyrene.

5) Polymers made by plasma polymerization (ex. perfluorinated compounds such as fluorobenzene followed by sulfonation, phosphorylation or carboxylation or plasma polymarization of phosphonic acid with tetrafluoroethylene)

6) Hybrid organic inorganic membranes made of a polymer or matrix of materials with proton conducting inorganic particles formed when a soluble non crosslinked inorganic material [e.g., zirconium phosphate, heteropolyacids for example phosphoatoantimonic acid] or precursor to such inorganic particles such as for zirconium oxide, zirconium phosphate, titanium oxide, aluminum oxide, silica, is dissolved in the common solvent with the polymer matrix.

7) The following polymers with sulfonic phosphonic or boronic acid groups chosen from polyheterocyclics such as polybenzimidazole, polyoxazoles, polypyridines, polypyrimidines, polyimidazoles, polythiazoles, polybenzoxazoles, polyoxadiazoles, polyquinolines, polyetherketones polyethersulfones and polyphenylquinoxalines Perfluorinated sulfonic membranes.

8) Sulfonated substituted and non substituted trifluorostyrene based polymers Radiation grafted FEP (perfluoroethylene-perfluoropropylene copolymer) or polyethylene-alt-tetrafluroethylene (ETFE) with styrene followed by sulfonation. Sulfonated random copolymer of styrene-butadiene and sulfonated triblock polymer of styrene-ethylene/butylene-styrene; Sulfonated triblock polymer of styrene-ethylene/butylene-styrene; Sulfonated polyarylene sulfide sulfones and polyarylene sulfones, polyarylene sulfide sulfones and polyarylene sulfones, sulfonated polystyrene copolymerized with tetrafluoroethylene, Sulfonated polystyrene, polyethylene acrylics methacrylics, perfluorosulfonic polymers; Sulfonated polyphosphazenes polymers.

The sulfonation of the block copolymers is carried out such that it occurs preferentially on only one of the blocks. For example, in the case of triblock polymer of styrene-ethylene/butylene-styrene, the sulfonation may be only on the aromatic groups of styrene, e.g., a polystyrene-block-polyethylene-ran-butylene)-block-polystyrene, sulfonated [29 wt. % styrene where 45-55% of styrene units are sulfonated] produced by Aldrich Chemical Company Catalog No. 44,888-5)

9) Aryl polymers-sulfinated sulfonated and aminated polysulfone polyether sulfones. Phosphoatoantimonic acid in sulfonated polysulfone solution; Polymers based on bis[perfluoroalkyl)sulfonyl]imides.

Polymers by nitrating PES PSu PEEK and optionally reducing the nitro to amines then sulfonating, Sulfonated Kraton materials, Highly sulfonated poly(thiophenylene)

10) Polyethylene ionomers especially those based on polyethylene copolymers with carboxylic groups or such as acrylic acid, and or methacrylic acid, maleic acid. Examples of such polymers are metal salts of polyethylene-co-methacrylic acid, maleated ethylene-propylene-diene rubber, maleated high-density polyethylene, maleated polypropylene, polyethylene-co-acrylic acid and carboxylated acrylonitrile-butadiene rubber, and carboxylated nitrile rubber. Wherein the ionic monomer comprises from 2 to 20% wt % of the copolymer, Sulfonated elastomeric ionomers such as copolymers of 2-butylstyrene sulfonate and isoprene, copolymer of sodium styrene sulfonate and isoprene, sulfonated isobutylene isoprene copolymers, sulfonated ethylene propylene terpolymers [such as sulfonated ethylene-propylene-diene rubber], and sulfonated styrene or butadiene styrene block copolymers. The water insoluble sulfonated polymers may have sulfonic groups in the range of 0.04- to 2-meq/gr polymers and preferable 0.1 to 1 meq/gr. The counter ions of the aforementioned polymers may be chosen from a range of cations. Some preferred cations are H+, Na, K, Li and Zn.

EXAMPLES

The following examples of embodiments of the invention are intended to be illustrative and not limitative.

Example 1

Membrane samples of different cation exchange resin content were prepared by using quantitaties of matrix precursor (two component silicon rubber-RTV) and cation exchange resin powder made of spherical particles 30-40 μm in diameter according to the following Table IV:

TABLE IV

| Resin Content | Matrix Precursor (gr) | | |
|---|---|---|---|
| (W %) | Component A | Component B | Resin Powder (gr) |
| 10 | 0.811 | 0.089 | 0.1 |
| 15 | 0.772 | 0.078 | 0.15 |
| 20 | 0.727 | 0.073 | 0.2 |
| 30 | 0.636 | 0.064 | 0.3 |
| 40 | 0.545 | 0.055 | 0.4 |
| 50 | 0.455 | 0.045 | 0.5 |

The components were mixed together and the viscous mixture was poured into the membrane preparation form described in FIG. 1. The cell was closed with the upper electrode module and a 50 Hz AC electric field of strength of 860 V/cm was applied between the electrodes for 4 Hrs at room temperature. The cell was then opened and the cured membrane taken out and equilibrated in 0.1 M KCl solution. The same procedure was applied to a second preparation but without the electric field. The conductivities of the ordered and non-ordered membranes were measured in a standard cell used for this purpose. It was found that the ordered membranes carry a much higher specific conductivity with respect to the non-ordered ones. The results are shown in FIG. 2a.

Example 2

The same procedures as in example 1 were applied to a 200 to 270 mesh cation exchange powder with non-spherical particles. The results are depicted in FIG. 2b, with significantly improved conductivity for the ordered membranes compared with the non-ordered ones.

Example 3

The same procedures as in Example 1 and 2 are applied to powders made of spherical and non-spherical anion exchange resins. As in the previous examples, the ordered anion exchange membrane thus obtained have a much larger specific conductivity as compared to the random ones.

Example 4

In the above procedures, the a-priori liquid silicon rubber was replaced by low density polyethylene flakes melted at a temperature above 120° C. and mixed by some standard methods with a cation or anion exchange powders in spherical and non-spherical shapes. AC electric fields strengths in the range 300 to 2000 V/cm were applied to the melt that was cooled gradually in a period of 2-6 Hrs. The specific conductivities of the membranes thus prepared were compared to random membranes prepared with the same materials but without the application of an electric field. As in the previous examples, the ordered membranes show a much higher specific conductivity as compare to the random membranes.

Example 5

Example 4 was repeated using a powder, in a pellet configuration, of the copolymer poly(ethylene-co-acrylic sodium salt), where in the acid component was 5 wt % acrylic acid, having a Tm (DSC) 98° C. instead of the low density polyethylene, with cation exchange particles. As in the previous example, the ordered membranes showed a much higher specific conductivity, compared to the random membranes.

Example 6

Preparation of an ordered proton conducting membranes. The matrix of the membrane is polyvinylidene fluoride (PVDF)[Tm 165-170, Average Mn of 71,000 purchased from Aldrich Catalog No. 42,715-2] and the proton conducting materials are of phosphotungistic acid (PTA). PVDF films are non-permeable to methanol and PTA is a well-known proton conductor. 15 grams of PVDF are dissolved in 85 grams of 1-methyl-2-pyrrolidionone.

To this solution, 5.2 grams of PTA (34% of PVDF) were added and mixed homogeneously into the polymer solution. The mixture was then cast on a Teflon plate and dried at 70° C. in a convection oven to give a 100 micron thick membrane. This membrane was then placed between two electrodes of configuration, as described in Example 1 and placed in a chamber which was flooded with argon and heated 160° C. for 0.5 hours with 20 volts applied across the membrane. After two hours, the heating was stopped and the system allowed cooling to room temperature with the applied voltage still on. The proton conductivity of this membrane was significantly higher compared to a membrane made exactly the same way without the applied field.

Example 7

Preparation of an ordered proton conducting membranes by the ordering of phase separated domains (Embodiment 4).

All the polymeric materials are dried overnight at 80° C. in a vacuum oven. The matrix of the membrane is 15 grams of polyvinylidene fluoride-co-hexafluoropropylene (PVDF-co-HFP)[Tm 155-160, Average Mn of 110,000 and 5.2 grams of the proton conducting polymer sulfonated polysulfone in the hydrogen form with a capacity of 1.6 meq/gr are dissolved in 85 grams of 1-methyl-2-pyrrolidionone.

The solution was then cast as a 0.5 mm wet film on a graphite electrode of 10 cm² area. Over this another graphite electrode was placed at a height of 1.0 mm leaving a space gap of 0.5 mm. The electrode system with the wet membrane was placed in an oven at 70° C. with a stream of dry argon flowing through the space gap between the top electrode and the surface of the wet film. Across the electrode system 200V at 50 Hz AC was applied for 12 hours to evaporate the solvent and form a solid membrane. The heating was stopped and the system allowed cooling to room temperature with the applied voltage still on. The proton conductivity of this membrane was significantly higher compared to a membrane made exactly the same way without the applied field.

Similar results were also obtained using a vacuum rather than a stream of dry Argon to evaporate the solvent.

When the above procedure is repeated while the proton conducting polymer was sulfonated polyethersulfone in the hydrogen form with a capacity of 1.8 meq/gr made by the procedure described in Example 6 of U.S. Pat. No. 4,508,852, and the solvent evaporated under a vacuum, the resulting membrane showed a proton conductivity which is significantly higher than of a membrane made exactly the same way without the applied field.

When the above procedure is repeated while the proton conducting polymer was sulfonated triblock polymer of polystyrene-block-polyethylene-ran-butylene)-block-polystyrene, sulfonated [29 wt. % styrene where 45-55% of styrene units are sulfonated] produced by Aldrich Chemical Company Catalog No. 44,888-5) in the hydrogen form and the solvent evaporated under a vacuum, the resulting membrane showed a proton conductivity which is significantly higher than of a membrane made exactly the same way without the applied field.

Example 8

Example 7 is repeated wherein the solution was then casted as a 0.5 mm wet film on a graphite electrode of 10 cm$^2$ area. Over this another graphite electrode was floated on the surface of the wet film. The electrode system with the wet membrane was placed in an oven at 70° C. with a stream of dry nitrogen flowing through the oven. Across the electrode system 200V at 50 Hz was applied for 12 hours to evaporate the solvent and form a solid membrane. The heating was stopped and the system allowed cooling to room temperature with the applied voltage still on. Like in example 7, the proton conductivity of this membrane was significantly higher compared to a membrane made exactly the same way without the applied field.

Example 9

Example 1 is repeated using nanosized silica particles, instead of organic ion exchange particles. The membrane made under an electric field had higher conductivity than the membrane without the applied electric field.

While embodiments of the invention have been described by way of illustration, it will be understood that the invention may be carried out with many variations, modifications and adaptations, without departing from its spirit or exceeding the scope of the claims.

The invention claimed is:

1. Process for producing ion exchange membranes, which comprises the steps of:
   a) providing a matrix material, comprising a polymeric component chosen from the group consisting of monomeric and oligomeric polymer precursors and cross-linkable polymers;
   b) introducing in said matrix ion cation or anion exchange particles, or proton or hydroxyl or ion conducting particles or any combination thereof; or cation or anion exchange polymers, or proton or hydroxyl or ion conducting polymers, or any combination thereof;
   c) mixing said particles or dissolving said polymer of step (b) with said matrix, wherein said particles or said polymers are used in amounts from 20 to 40 wt % of the combined amount of said matrix, and said particles or polymers;
   d) forming the resulting mixture into membrane configuration;
   e) ordering by an electric field said particles or ordering by an electric field the domains of said polymer formed by polymer-matrix phase separation upon solvent evaporation or cooling, wherein said electric field has intensity from 50 to 20,000 V/cm; and
   f) if said matrix comprises or consists of a polymer precursor or a cross-linkable polymer, said precursor is cured concurrently with said ordering of said particles, or if the matrix comprises a polymer solution or polymer melt the said polymer solution is evaporated or the said polymer melt is maintained and then cooled concurrently with said ordering of said particles;
   wherein the resulting membrane thickness is between 10 to 500 microns.

2. Process according to claim 1, wherein the matrix material comprises or consists of a polymer.

3. Process according to claim 1, wherein the matrix material comprises or consists of a polymer precursor.

4. Process according to claim 3, wherein the polymer precursor is cured concurrently with said ordering of the ion exchange particles.

5. Process according to claim 1, wherein the introduction in the matrix of the ion exchange particles and the mixing of said particles with said matrix are carried out concurrently.

6. Process according to claim 2, wherein said polymer is homogeneously mixed with ion exchange particles either at elevated temperatures or when dissolved, and wherein said polymer is chemically resistant in acids and/or bases and/or oxidants.

7. Process according to claim 3, wherein the polymeric matrix is a material homogeneously mixed with ion exchange particles or polymers when not yet cured at elevated temperatures or when dissolved, and when cured a polymer is formed that is chemically resistant in acids and/or bases and or oxidants.

8. Process according to claim 1, wherein the polymeric matrix is chosen from the group consisting of polyethylene, polypropylene and polyamides.

9. Process according to claim 1, wherein the polymeric matrix is chosen from the group consisting of polyvinyl halogenated homo polymers, or copolymers, block-co- or tri-polymers or grafted polymers and engineering plastics.

10. Process according to claim 9, wherein the polyvinyl halogenated polymers are chosen from the group consisting of polyvinylidenefluoride (PVDF), PVDF copolymers, polyvinylidene chloride copolymers and polyvinyl chloride copolymers, polytetrafluoroethylene (PTFE), polyhexafluoropropylene (PHFP), polychlorotrifluoroethylene (PCTF), and co- and ter-polymers of the above, such as PVDF-co-PTFE, PVDF-co-PTFE, PVDF-co-PHFP, PVDF-co-PCTF, poly(perfluoroalkyl dioxides) as a homopolymer and copolymers with other fluorinated monomers such as vinylidene fluoride or tetrafluoroethylene.

11. Process according to claim 1, wherein the ion exchange particles are chosen from among porous and non-porous particles and have an ion exchange capacity of 2 to 5 meq/g (dry basis) for the cation exchanges and of 1 to 3 meq/g (dry basis) for the anion exchangers.

12. Process according to claim 1, wherein the ion exchange particles have diameters from 0.2 to 200 microns.

13. Process according to claim 12, wherein the ion exchange particles have diameters from 20 to 50 μm.

14. Process according to claim 1, wherein the ion exchange particles are in the nano-size range.

15. Process according to claim 1, wherein the ion exchange particles are spherically shaped beads.

16. Process according to claim 1, wherein the ion exchange particles are fibers, platelets or irregular shaped particles.

17. Process according to claim 1, wherein the ion exchange particles are in the form of a powder made of ground particles.

18. Process according to claim 1, wherein the electric field has intensity from 800 to 1500 V/cm.

19. Process according to claim 1, wherein the electric field is an alternating field.

20. Process according to claim 19, wherein the electric field has a frequency from 5 to 2000 Hz.

21. Process according to claim 20, wherein the electric field has a frequency from 20 to 150 Hz.

22. Process according to claim 1, wherein the electric field is a DC field.

23. Process according to claim 1, wherein the electric field is applied for periods up to 10 hours.

24. Ion exchange membranes, according to claim 1, comprising a polymer matrix and ion cation or anion exchange particles, or proton or hydroxyl or ion conducting particles; or any combination thereof; or domains of cation or anion exchange polymers, or proton or hydroxyl or ion conducting polymers, or any combination thereof wherein said domains occurred by matrix polymer incompatibility, and wherein said particles or domains are generally ordered, wherein said membranes are optionally ion conducting membranes.

25. Ion exchange and ion conducting membranes according to claim 24, wherein the matrix comprises a material chosen from the group consisting of polyethylene, polypropylene, polyamides, polybenzimidazole, polysulfones, polyether sulfones, polyvinylidene fluoride, polyvinylidene fluoride copolymers, polyvinylidene chloride copolymers and polyvinyl copolymers; wherein the ion exchange and conducting particles or domains have an ion exchange capacity of 0.5 to 5 meq/gr (dry basis) for the cation exchanges and of 1 to 3 meq/g (dry basis) for the anion exchangers, the diameters or the shortest dimension of which, are ranging from 0.002 to 200 microns, and their amounts are from 10 to 70 wt % of the membrane.

26. Ion exchange and ion conducting membranes according to claim 24, having a configuration chosen from the group consisting of flat, tubular, capillary, or hollow fiber configurations.

27. Ion exchange and ion conducting membranes according to claim 24, having an improved passage of protons and a greater selective passage of protons compared to methanol or hydrogen gas compared to membranes wherein the particles or domains are not ordered.

28. Process according to claim 1, wherein the polymeric matrix is chosen from the following group of polymers, made by condensation polymerization:

polysulfone, polyphthalimidazole, polyether sulfone, polyphenylene sulfone, polyether ketone, and other variations of polyether ketones and polysulfones, polyphenylene sulfide, phenylene sulfone and variations of sulfide and sulfone in the same polymer, polyethers based on polyphenylene oxide such as 2,6 dimethylphenylene, aromatic polyether imides, polyether amide-amide, aromatic polyamides and aromatic aliphatic polyamide combinations, polybenzimidazole, halomethylated derivatives of the above polymers on the aromatic or aliphatic groups.

29. A fuel cell comprising a membrane according to claim 24.

* * * * *